Patented Jan. 8, 1924.

1,480,439

UNITED STATES PATENT OFFICE.

HENRY JOHN EDMUND HAMILTON, OF NORTH BROKEN HILL, NEW SOUTH WALES, AUSTRALIA.

TREATMENT OF SULPHIDE AND OXIDIZED ORES.

No Drawing.  Application filed July 16, 1920. Serial No. 396,782.

*To all whom it may concern:*

Be it known that I, HENRY JOHN EDMUND HAMILTON, a subject of the King of Great Britain and Ireland, residing at William Street, North Broken Hill, State of New South Wales, Commonwealth of Australia, have invented certain new and useful Improvements in the Treatment of Sulphide and Oxidized Ores, of which the following is a specification.

The invention relates to improvements in the treatment of sulphide and oxidized ores, or the products of such ores wherein certain of the metal constituents of the ores, or ore products, are converted into salts of their respective metals, which metals are subsequently recovered. Other sulphide minerals (such as zinc sulphide) remain practically unchanged as regards their chemical composition; and are recovered by well known froth flotation processes.

The invention is specially applicable to ores and ore products containing minerals of silver, lead, and zinc; but it will be understood that the application of my invention is not confined to these minerals only.

The term ore product, as used in this specification, is intended to embrace all products, resulting from milling, and flotation practice, that is concentrates, tailings, middlings, slimes, and residues, and is also intended to cover products resulting from the chemical and metallurgical treatment of ores, or ore products.

In carrying out my invention the ore, or ore product, is ground to a sufficiently fine state of division, and is roasted in a suitable open furnace to which air has free access, with a chloride of an alkali metal, such as sodium chloride, (common salt) added in the requisite proportion. The roast is conducted at a temperature below or approximating 400 degrees centigrade, with the object of selectively chloridizing certain of the sulphide and oxidized minerals that partly compose the ore or ore product. In this manner the roast is continued until certain of the metal values present, are converted into chlorides of their respective metals.

The chloridized material is then leached with a hot boiling temperature solution of a chloride of an alkali metal, such as sodium chloride (common salt); and the clarified liquor from such leaching operation, whilst still at hot temperature or boiling point, is drawn off, and its metal constituents recovered by deposition on galvanized iron, aluminium, or zinc, keeping the solution at hot to boiling temperature.

To prevent oxidation, the metal, as deposited on the galvanized iron, aluminium, zinc, or other metal is then transferred to a suitable pressing machine and compressed whilst under water. When thus compressed the metal is ready for simple melting down in accordance with well known metallurgical practice.

In dealing with an ore or ore product containing minerals of lead, silver, and zinc, by the treatment herein described, it will be found that the major portion of the lead, and part of the silver values, are contained in the liquor from the leaching operation. Also that the silver and lead contents contained in such liquor are readily deposited on galvanized iron, aluminium, zinc, or other metal in the form of metallic lead and silver.

In certain instances I find the leaching of the chloridized ore, or ore product, in hot chloride solution results in part of the silver remaining with the residual sludge from leaching operations, as silver chloride. Especially is this so when the sodium chloride solution used in the leaching operation is of comparatively weak strength. In such cases I use additional solvent agents, such as hyposulphide of soda, to aid in the solution of the chloridized silver values remaining in the residual sludge from leaching operations.

Under the treatment explained in the foregoing paragraphs the original zinc content of the ore, or ore product, existing as zinc sulphide is more or less unchanged by the low temperature roasting of the treatment; and if required, such zinc sulphide mineral may be recovered by one of the well known froth flotation processes as zinc blende concentrate of exceptionally high zinc value.

The percentage of sodium chloride (common salt) used in effecting the chloridizing varies according to the percentage lead content of the ore, or ore product, under treatment. I have found, with ores, and ore products, assaying ten per cent of lead, that approximately twenty per cent of added sodium chloride gives an excellent chloridization of the lead content; but, as ores and ore products vary so in their mineral contents I do not confine myself to any definite percentage addition of sodium chloride (or chlorides) for chloridizing purposes.

The percentage strength of the sodium chloride solution used in leaching operation will vary according to the nature of the chloridized material under treatment. I therefore do not bind myself to any definite strength of sodium chloride solution, but my research goes to show that it is desirable to use a strong solution of sodium chloride at hot to boiling temperature; and as a general rule favorable deposition results are effected in solutions ranging from a saturated solution down to fifteen per cent common salt. The solution of sodium chloride resulting from leaching and deposition retains its properties and is utilized for successive charges of chloridized material. The following examples illustrate applications of my invention as applied to ores and ore products.

Example 1. 1000 grammes of an ore product, viz: mill slime, assaying 12.6% Pb; 8.6 ozs. Ag; 13.6% Zn.—of which the oxidized values were 8.5% Pb; and 1.9% Zn.— was roasted for 20 minutes with 250 grammes of common salt at a temperature approximating 400 degrees centigrade. The mill slime thus selectively chloridized was transferred to an enamelled bucket, to which was added 6 litres of a 20% solution of common salt, and submitted to a hot to boiling temperature leaching for a period of 30 minutes. After settlement of suspended matter, and whilst still at hot temperature, the chloride solution resulting from such leaching operation was decanted (or drained) off into another enamelled bucket. Sheets or strips of metallic zinc (such as obtained from zinc lined boxes) were suspended in this solution, which was maintained at hot to boiling temperatures, resulting in the rapid deposition of the lead-silver constituents on the sheets of zinc. The residual sludge from leaching operation assayed 3.3% Pb; 8.1 ozs. Ag; 13.3% Zn.

The mill slime used in this example as feed was highly oxidized as a result of long exposure to weathering.

Example 2. 1000 grammes of an ore, viz: a crude sulphide ore, crushed to pass 60 mesh screen, and assaying 9.1% Pb; 5.5 ozs. Ag; and 9.4% Zn, was roasted for 15 minutes with 250 grammes of common salt at a temperature approximating 400 degrees centigrade. The crude sulphide ore thus selectively chloridized was transferred to an enamelled bucket, to which was added six litres of a 20% solution of common salt, and was then submitted to a hot to near boiling temperature leaching, and leached for a period of 30 minutes. The lead-silver constituents contained in the chloride solution resulting from this leaching operation were then deposited on sheets of metallic zinc, (similarly as in example 1).

The residual sludge from the leaching operation was then submitted to the well known acid-oil froth flotation process resulting in the production of a float zinc concentrate assaying 7.0% Pb; 12.0 ozs. Ag; and 51.8% Zn; and a final residue assaying 2.3% Pb; 3.5 ozs. Ag; and 6.5% Zn.

Example 3. 1000 grammes of an ore product, viz: ordinary mill slime, assaying 14.2% Pb; 10.1 ozs. Ag; and 13.2% Zn, was roasted for 20 minutes with 250 grammes of common salt at a temperature approximating 400 degrees centigrade. The mill slime thus selectively chloridized was transferred to an enamelled bucket, to which was added six litres of a 15% solution of common salt, and was submitted to leaching for a period of 45 minutes, at a temperature ranging from hot to near boiling point. The lead constituents contained in the chloride solution resulting from this leaching operation were then deposited on sheets of metallic aluminium in the form of lead bullion. The residual sludge from leaching operation was then subjected to the well known acid-oil froth flotation process, resulting in the production of a zinc concentrate assaying 2.4% Pb; 17.7 ozs. Ag; and 53.0% Zn, and a residue, assaying 5.7% Pb; 4.8 ozs. Ag; and 4.2% Zn.

In these examples, it will be understood that I have aimed at demonstrating the salient merits of my invention. The apparatus available for conducting the experiments did not permit of high efficiency of metallurgical results.

What I claim is:—

1. A process for separating metalliferous substances from each other and from their gangue constituents; characterized in that the ores, and ore products, containing such metalliferous substances are (a) subjected to a selective chloridizing roast at a temperature below or approximating 400 degrees centigrade in an open furnace to which air has free access; (b) then leached in the presence of a boiling or hot temperature solution of a chloride of an alkali metal, such as sodium chloride (common salt); and (c) then subjecting the resulting solution to the action of a metallic precipitant to deposit the lead and silver.

2. A process for separating metalliferous substances from each other and from their gangue constituents; characterized in that the ores or ore products containing such metalliferous substances are submitted to a selective chloridizing roast at a temperature below or approximating 400 degrees centigrade in an open furnace to which air has free access; and the sulphide constituents (such as zinc sulphide), which are practically unaffected by such selective chloridizing roast, recovered by the well known acid-oil froth flotation processes.

In testimony that I claim the foregoing as my invention I have signed my name in the presence of two subscribing witnesses this first day of June, 1920.

HENRY JOHN EDMUND HAMILTON.

Witnesses:
CECIL DUNSTAN CHERRY,
ALFRED WALTER LEWIS.